United States Patent
Fukada et al.

[11] Patent Number: 5,123,383
[45] Date of Patent: Jun. 23, 1992

[54] INTAKE SYSTEM FOR INTERNAL COMBUSTION ENGINE

[75] Inventors: Hirotaka Fukada; Takashige Ishikawa, both of Hiroshima; Yasuhiro Kawasako, Aichi; Kazuaki Hokazono; Masanori Nakamura, both of Hiroshima, all of Japan

[73] Assignee: Mazda Motor Corporation, Hiroshima, Japan

[21] Appl. No.: 676,972

[22] Filed: Mar. 29, 1991

[30] Foreign Application Priority Data

Mar. 29, 1990 [JP] Japan .................. 2-86331

[51] Int. Cl.$^5$ .............................. F02M 35/10
[52] U.S. Cl. .............................. 123/52 MV
[58] Field of Search ........ 123/52 MV, 52 MC, 52 M, 123/52 MB, 52 MF

[56] References Cited

U.S. PATENT DOCUMENTS

| | | | |
|---|---|---|---|
| 4,981,115 | 1/1991 | Okasako et al. | 123/52 MV |
| 4,989,553 | 2/1991 | Ueda et al. | 123/52 MV |
| 5,000,130 | 3/1991 | Yamada | 123/52 MB |
| 5,048,471 | 9/1991 | Takii et al. | 123/52 MV |

FOREIGN PATENT DOCUMENTS

62-159725 7/1987 Japan .
0119619 5/1990 Japan ........................ 123/52 M Primary Examiner—David A. Okonsky
Attorney, Agent, or Firm—Fleit, Jacobson, Cohn, Price, Holman & Stern

[57] ABSTRACT

An intake system delivers air into cylinders of an internal combustion engine which are divided into two groups. The cylinders in each group are arranged in one and the same row so that adjoining cylinders in each row do not fire one after another. The intake system has conflux chambers for the cylinder rows, connected to the cylinders by intake passages, and also interconnected to each other by a communication passage having a valve. First and second resonant passages are each connected at one end to the respective conflux chambers and are joined together to communicate with each other at another end, opposite to the one end, in a location at which a throttle body is located. The first resonant passage has a connection point with one conflux chamber closer to an interconnection between both the conflux chambers than a connection point in a lengthwise direction of the second resonant passage with another conflux chamber.

8 Claims, 6 Drawing Sheets

INTAKE SYSTEM FOR INTERNAL COMBUSTION ENGINE

BACKGROUND OF THE INVENTION

1. Field of the Invention

The present invention relates to an intake system for an internal combustion engine, and, more particularly, to an intake system improved by utilizing resonance effects of intake air.

2. Description of Related Art

A known internal combustion engine has been developed with improved charging efficiency obtained by utilizing resonance effects of intake air. Typically, an intake system for supercharging by utilizing the resonance effects of intake air is used for an internal combustion engine which has a plurality of cylinders divided into two groups, the cylinders in each group being disposed so that adjoining cylinders in each cylinder group do not fire one after another. Individual, or discrete, intake passages of the cylinders of each cylinder group are joined together at their upper ends by a conflux chamber, such as a surge tank. The surge tank is connected to what is called a collection intake passage, i.e., a resonant passage, with a pressure reverse portion formed at a desired location of the resonant passage.

In a tuned speed range of the engine, fundamental pressure waves of intake air, generated at intake ports of the cylinders of each cylinder group, and reflected pressure waves, reversed at the pressure reverse portion, coincide with one another in phase so as to cause the pressure waves of intake air, propagating both ways between the pressure reverse portion and each cylinder, to resonate in the resonance passage. In such a way, a resonant pressure wave having a high amplitude is generated by means of the resonance of intake air due to pressure vibrations generated individually in the cylinders. The resonant pressure wave thus obtained forces the intake air to be charged into a combustion chamber of each cylinder with high charging efficiency. Such an intake system is known from, for instance, Japanese Unexamined Patent Publication No. 62-159725.

In the prior art intake system which has elongated conflux tanks, such as surge tanks, for the respective groups of cylinders, if the surge tanks are interconnected at their intermediate longitudinal portions by a communication passage and the communication passage is controlled to open in a range of higher engine speeds, the resonance effect of intake air is abolished and the generation of troughs of engine output torque accompanying the resonance effect can be diminished.

SUMMARY OF THE INVENTION

A primary object of the present invention is to provide an intake system for an internal combustion engine which can strengthen the resonance effect by using an communication passage by which two conflux chambers are intercommunicated, while obtaining an improved effect of engine output torque by means of the communication passage.

In order to achieve this object, the intake system according to the present invention, for delivering, or charging, air into a plurality of cylinders of an internal combustion engine, has cylinders divided into first and second groups. The cylinders in each group are arranged in the same row so that adjoining cylinders in each row do not fire one after another. First and second elongated conflux chamber means are connected to the first and second group of cylinders, respectively, by independent intake passages. The first and second elongated conflux chamber means are intercommunicated by communication passage means, with valve means, at approximately longitudinal intermediate portions. First and second resonant passage means are connected at one end to the first and second elongated conflux chamber means, respectively, and communicated with each other at their other ends, where a throttle body is located. The first resonant passage means is connected to the first elongated conflux chamber means at a point in a lengthwise direction thereof closer to an intercommunication point of the first and second elongated conflux chamber means than a point where the second resonant passage means is connected to the second elongated conflux chamber means. Thus, a volume is provided between the first conflux chamber means and the first resonant passage means which is larger than a volume provided between the second conflux chamber means and the second resonant passage means.

In the intake system according to the present invention, when the communication passage is blocked by closing the changeover valve, the pressure wave of intake air, propagating both ways between the pressure inversion portion of the resonant passage and each cylinder, resonates within the resonant passages. Due to the resonance, a resonant pressure wave with large amplitude is generated by the vibration individually generated in each cylinder, and the resonant pressure wave charges intake air into the combustion chambers of the cylinders at a high charging efficiency.

On the other hand, when opening the changeover valve to open the communication passage and thereby to intercommunicate both the conflux chambers, a large volume of intake air is provided and the resonance effect of intake air is abolished. Because of this, the output torque trough due to the resonance effect is reduced.

In this case, since at least one resonant passage means is connected to either one of the conflux chambers near a portion where the conflux chamber is intercommunicated with the other conflux chamber, the volume of the one resonant passage increases by the volume of the communication passage near the downstream portion thereof, so as to provide an intensified resonant function of the pressure wave of intake air in the resonant passage.

BRIEF DESCRIPTION OF THE DRAWINGS

Still other objects of the present invention and more specific features will become apparent to those skilled in the art from the following description of the preferred embodiments when considered together with the accompanying drawings, wherein similar reference numbers have been used to denote the same or similar elements throughout the drawings, and in which.

DETAILED DESCRIPTION OF THE PREFERRED EMBODIMENT

Figure 1:
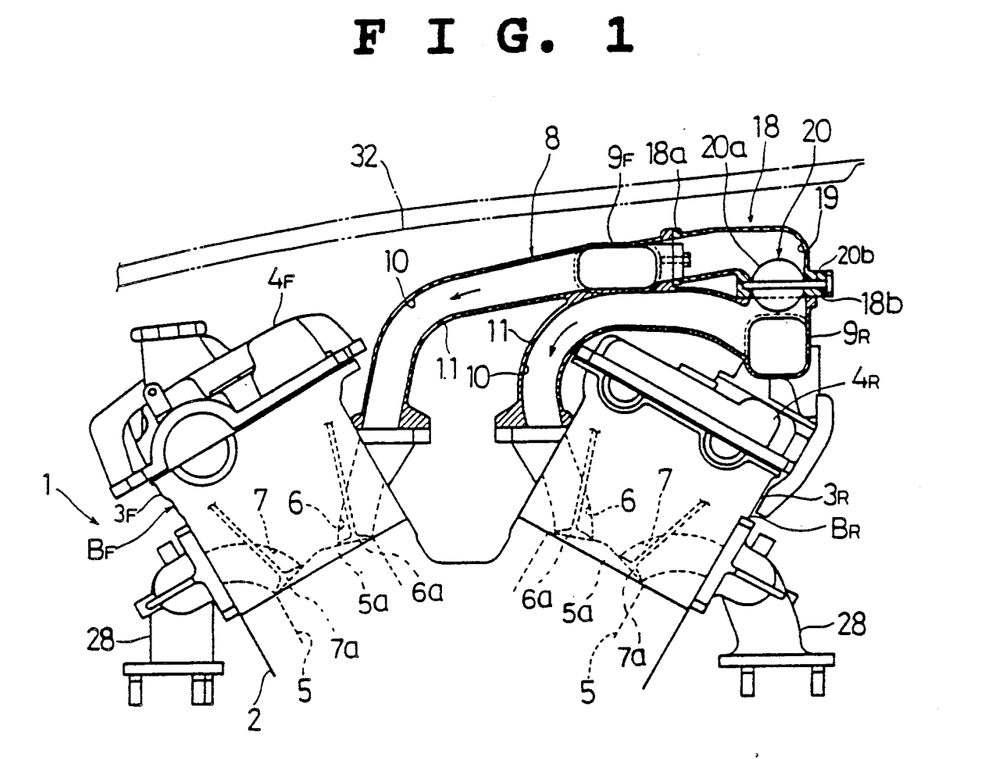
FIG. 1 is a side view showing, partly in cross section, part of a V-type internal combustion engine with an intake system in accordance with a preferred embodiment of the present invention.
Figure 2:
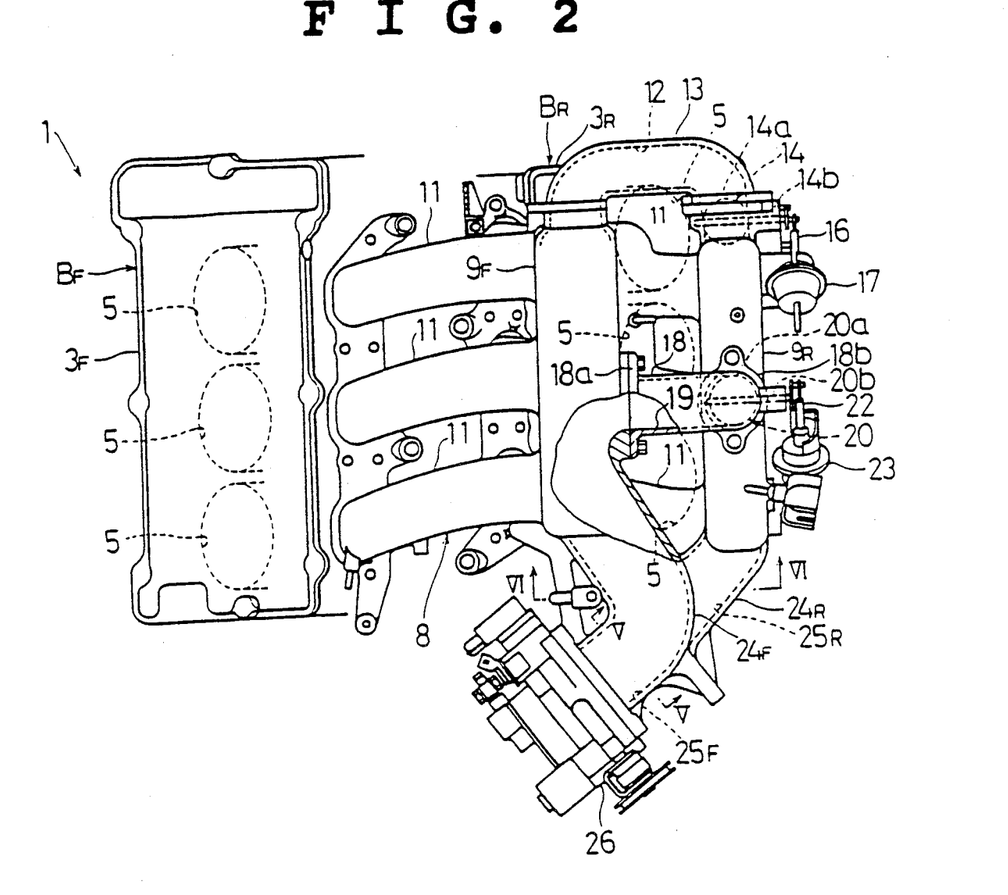
FIG. 2 is a plan view of FIG. 1.

Referring to the drawings in detail, and particularly to FIGS. 1 and 2, a V-type, six-cylinder, internal combustion engine with an intake system in accordance with a preferred embodiment of the present invention is shown. The V-type, six-cylinder, internal combustion engine 1 (which is referred hereinafter to as an engine for simplicity) is mounted on the chassis of a car body with an output axle (not shown) extending transversely with respect to the vehicle and located under a bonnet 32. The engine 1 includes left or front and right or rear cylinder banks BF and BR arranged in a V-formation and at predetermined relative angle, for instance, a relative angle of 60 degrees. The No. 1, No. 3 and No. 5 cylinders 5 are formed in the front cylinder bank BF, and the No. 2, No. 4 and No. 6 cylinders 5 are formed in the rear cylinder bank BR. The No. 1 cylinder, the No. 6 cylinder, the No. 3 cylinder, the No. 4 cylinder, the No. 5 cylinder and the No. 2 cylinder are fired in order. That is, the cylinders 5 are divided into two groups, and the cylinders 5 in each group are disposed in one and the same cylinder banks BF or BR, respectively, so that adjoining cylinders in each of the cylinder banks BF or BR do not fire one after another.

The cylinders 5 are, respectively, provided with intake ports 6 having openings which extend toward a V-shaped space V between the front and rear cylinder banks BF and BR. Further, the cylinders 5 are, respectively, provided with exhaust ports 7 having openings which extend into exhaust pipes 28 attached to the sides of the corresponding cylinder banks remote from the V-shaped space V.

The engine 1 has a cylinder block 2. A left, or front, cylinder head 2F is mounted on the cylinder block 2 and provides for the front cylinder bank BF, and a right, or rear, cylinder head 2R is mounted on the cylinder block 2 and provides for the rear cylinder bank BR. Cylinder head covers 4F and 4R are provided to cover the upper portions of the front and rear cylinder heads 2F and 2R, respectively. Combustion chambers 5a are formed in the tops of the cylinders 5. Intake ports 6 and exhaust ports 7 open into each combustion chamber 5a, and are opened and shut at a predetermined timing by intake valves 6a and exhaust valves 7a, respectively.

Above the engine 1 there is arranged an intake manifold 8, typically formed by casting. This intake manifold 8 is provided with a front, or left, conflux chamber, such as an elongated surge tank 9F, and a rear, or right, conflux chamber, such as an elongated surge tank 9R, for, and corresponding to, the front and rear cylinder banks BF and BR, respectively. Both the surge tanks 9F and 9R are disposed above the rear cylinder bank BR, and extend parallel to each other in a lengthwise direction of the cylinder bank, i.e., in the axial direction of the output axle of the engine 1. The surge tanks 9F and 9R independently function as conflux chambers. Specifically, the front surge tank 9F is disposed upward of the front end of the cylinder head cover 4R of the rear bank BR, and the rear surge tank 9R is disposed at a height lower than the front surge tank 9F upwards of the downstream end of the cylinder head cover 4R. The front surge tank 9F is integrally formed with three discrete intake pipes 11, respectively defining air passages 10 therein arranged at equal spacings on the front side thereof. Each intake pipe 11, after extending forward between the front and rear cylinder banks BF and BR, curves downwards and is connected at its end to each air intake port 6 of the front cylinder head 3F. Similarly, the rear surge tank 9R is integrally formed with three discrete intake pipes 11, defining air passages 10 therein, respectively, arranged at equal spacings on the front side thereof. Each discrete intake pipe 11, after extending forward between the front and rear cylinder banks BF and BR, curves downwards and is connected at its end to each air intake port 6 of the rear cylinder head 3R. The front surge tank 9F is located on, and structurally joined with, the upper surfaces of these three rear discrete intake pipes 11. All the intake pipes 11 are made short and equal in pipe length.

Figure 3:
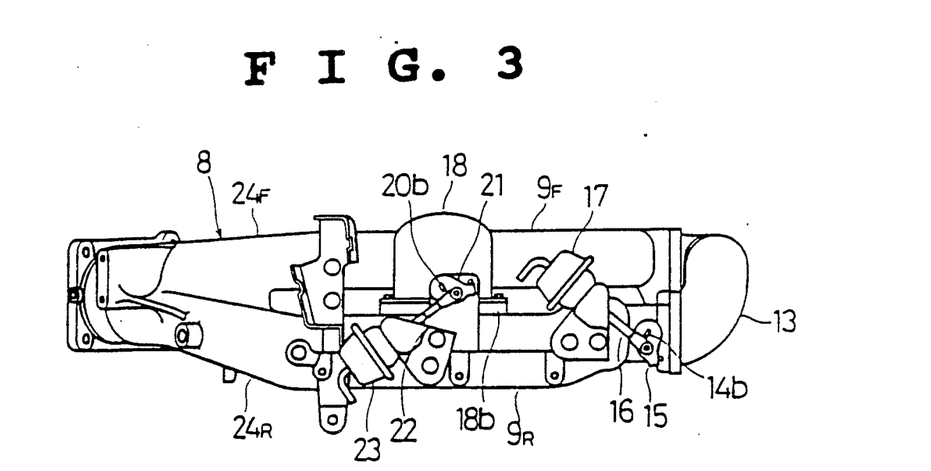
FIG. 3 is a rear view showing an intake manifold of the intake system.

As is shown in FIGS. 2 and 3, the right-hand end portions of both surge tanks 9F and 9R are communicated with each other by a first communication means, such as a pipe 13 defining therein a communication passage 12. The rear surge tank 9R is provided with a first changeover valve 14, formed by a butterfly valve, for changing over between connection and disconnection of the front and rear surge tanks 9F and 9R. Valve 14 is connected to the right-hand end of the rear surge tank where the first communication pipe 13 is connected. The changeover valve 14 has a valve body 14a secured to a valve shaft 14b which extends in a lengthwise direction of the car body. The rear end of the valve shaft 14b protrudes through the rear wall of the rear surge tank 9R and is coupled at its rear end to a negative pressure operated actuator 17 via a lever 15 and a rod 16 (see FIG. 3). The changeover valve 14 is opened by the operation of the negative pressure operated actuator 17. Both the surge tanks 9F and 9R, at the approximately mid portion in the lengthwise direction thereof, are interconnected by a second communication passage means, such as a pipe 18 defining therein a communication passage 19.

Figure 4:
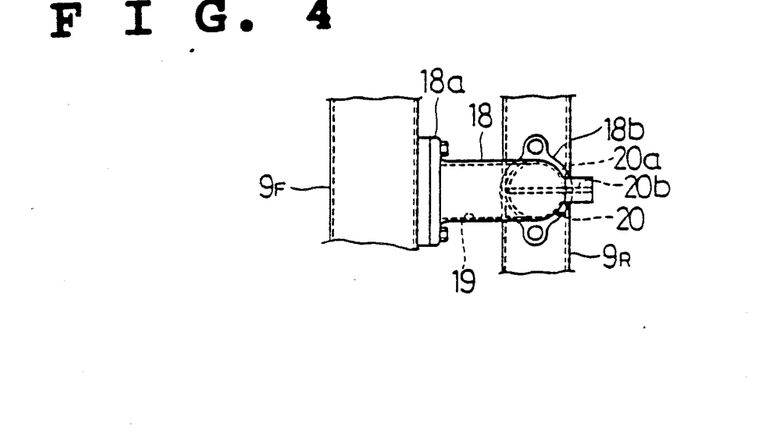
FIG. 4 is a plan view showing a communication pipe of the intake system.

Referring to FIG. 4, showing, in detail, a mounting structure of the second communication pipe 18, the rear portion of the second communication pipe 18 is a turned-down, approximately L-shaped pipe member forming therein a communication passage 19. The communication pipe 18 is formed with flanges 18a and 18b at the front end and rear lower end thereof, respectively. The front end flange 18a and the rear lower flange 18b are secured to a rear opening of the front surge tank 9F and to an upper opening of the rear surge tank 9R, respectively, by bolts. In such a way, the second communication pipe 18 is extended, passing between the front and rear surge tanks 9F and 9R. A second changeover valve 20, formed by a butterfly valve, is disposed in the rear portion of the second communication pipe 18 to open and close the communication passage 19. The changeover valve 20 has a valve body 20a secured to a valve shaft 20b which extends in the lengthwise direction of the car body. The rear end of the valve shaft 20b protrudes through the rear wall of the communication pipe 18 and is connected to a negative pressure operated actuator 23 via a lever 21 and rod 22 (see FIG. 3). The changeover valve 20 is opened by the operation of this actuator 23.

First and second changeover valves 14 and 20 are controlled to open and close according to engine speeds. That is, both the changeover valves 14 and 20 are kept closed in a range of lower engine speeds of the engine 1 and are opened in a range of higher engine speeds, but only the first valve 14 is opened in a medium range of engine speeds.

Figure 5:
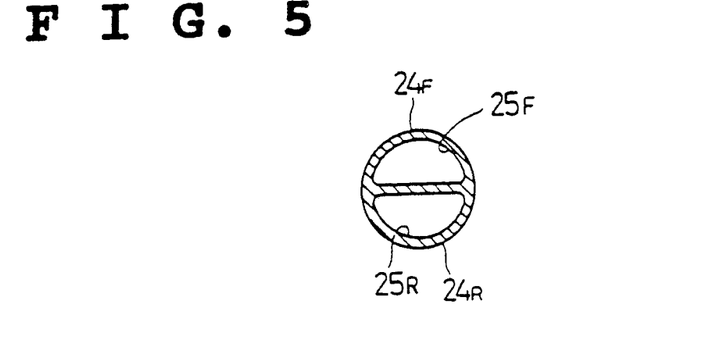
FIG. 5 is a cross-sectional view of FIG. 2 as seen along line V—V.
Figure 6:
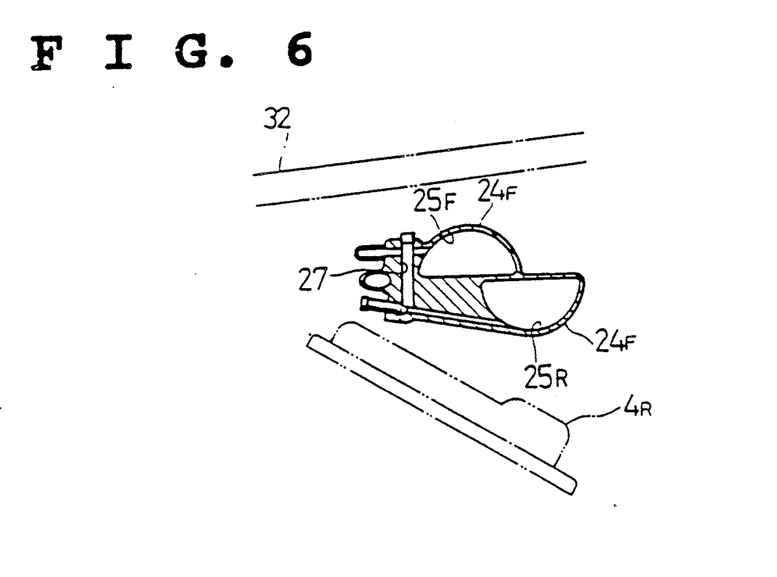
FIG. 6 is a cross-sectional view of FIG. 2 as seen along line VI—VI.

A front resonant passage means, such as a collecting pipe 24F, defining therein a resonant passage 25F, is connected at its downstream end to the left-hand end of the front surge tank 9F, and a rear resonant passage means, such as a collection pipe 24R, defining therein a resonant passage 25R, is connected at its downstream end to the left-hand end of the rear surge tank 9R. The upstream ends of the respective collection pipes 24F and 24R are connected to the throttle body 26 so as to join the resonant passages 25F and 25R together. That is, the rear collection pipe 24R extends in a straight line obliquely left and forward from the left-hand end of the rear surge tank 9R so that the central axis of the rear collection pipe 24R and the center line of the passage of the throttle 26 coincide. On the other hand, the front collection pipe 24F, extending obliquely left and rearward from the left-hand end of the front surge tank 9F and then curving obliquely left and forward, is located above the rear collection pipe 24R. As is clearly shown in FIGS. 5 and 6, the front and rear collection pipes 24F and 24R are joined together at their upstream ends so as to superimpose the resonant passages 25F and 25R, having semicircular cross-sections, one above the other. In the vicinity of the upstream ends of the front and rear collection pipes 24F and 24R, exhaust gas recirculation passages 27 open to the resonant passages 25F and 25R, respectively.

As is apparent from FIG. 2, the connection portion of the front collection pipe 24F for the front surge tank 9F is disposed adjacent to the connection portion of the second communication pipe 18. These pipes 18 and 24F are arranged so that extensions of center lines of their passages 25F and 19 intersect at an acute angle.

In the intake system thus constructed, the resonance effect of intake air takes place in the lower and medium engine speed ranges, so as to increase the quantity of intake air charged to each cylinder 5 and thereby to increase the output torque of the engine 1. In other words, according to the ranges of engine speeds, such as lower engine speed, medium engine speed and higher engine speed ranges, the first and second changeover valves 14 and 20 are opened or closed to adjust the tuning speed of resonance effects. Then, when the engine 1 operates in the range of lower speeds, the first and second changeover valves 14 and 20 are closed, so as to adjust the tuning speed to a lower speed. In this state, the location at which the fundamental pressure waves of intake air generated at the intake ports 6 of the cylinders 5 of each cylinder bank BF and BR invert is inside the throttle body 26 at the upstream ends of the resonant passages 25F and 25R. Therefore, pressure waves of intake air propagating both ways between the throttle body 26 and each cylinder 5 resonate in the intake passage so as to generate resonant pressure waves having a large amplitude due to the pressure vibration generated individually for the cylinder 5 by means of the resonance and thereby to charge the intake air into the combustion chambers of the cylinders 5 with increased charging efficiency. By this, the output torque of the engine 1 can be increased in the range of lower engine speeds.

In this case, because the connection portion of the resonant passage 25F of the front surge tank 9F is disposed adjacent to the connection portion of the communication pipe 18, an increase in volume is provided in the vicinity of the downstream end of the resonant passage 25F by the volume of the communication passage 19. Because the increased volume in the vicinity of the downstream end of the collection pipe 24F manifests a spring-like function when the air column in the resonant passage 25F resonates. Such an increase in volume enhances the resonant action of the pressure wave of intake air in the resonant passage 25. Consequently the output torque of the engine 1 can be greatly increased in the range of lower engine speeds.

When the engine 1 operates in the range of medium speeds, while the second changeover valve 20 remains closed, the first changeover valve 14 opens, so as to open the connecting passage 12 in the first communication pipe 13. As a result, the tuning speed of resonant effects is changed over into a medium speed. In this state, the location at which the fundamental pressure waves of intake air generated at the intake ports 6 of the cylinders 5 of each cylinder bank BF and BR invert is in the communication passage 12 in the first communication pipe 13, so that the pressure wave of intake air propagating both ways between the communication passage 12 and each cylinder 5 resonates in the intake passage. By means of this resonant pressure wave the intake air is charged into the combustion chambers of the cylinders 5 at a high charging efficiency, and the output torque of the engine 1 can be increased in the range of medium engine speeds.

In this case also, the connection portion of the collection pipe 24F of the front surge tank 9F is disposed adjacent to the connection portion of the second communication pipe 18 defining therein the communication passage 19, so as to enhance the resonant action of the pressure wave of intake air in the resonant passage 25. Consequently the output torque of the engine 1 can be greatly increased in the range of medium engine speeds, as well as in the range of lower engine speeds.

When the speed of the engine 1 changes into the range of higher speeds, the first and second changeover valves 14, 20 are both opened, and the respective communication passages 12 and 19 of the first and second communication pipes 13 and 18 are opened. In this state, because both the surge tanks 9F and 9R are mutually communicated, at approximate middle portions in the lengthwise direction, by the communication passage 19 of the second communication pipe 18, and a large increase in volume is provided by these surge tanks 9F and 9R and the communication pipe 18, the above-mentioned resonance effect vanishes. Because of this, a drop in output torque, at engine speeds other than the tuning speed, which is detrimental to the resonant effect, is assuredly prevented, with the result of a reduced "torque trough." As is apparent from the above, the output torque of the engine 1 can be increased throughout a variety of engine speeds, from a lower engine speed range to a higher engine speed range.

Due to the structure permitting the rear collection pipe 24R to extend in a straight line obliquely forward and to the left from the left-hand end of the rear surge tank 9R and the central axis thereof to coincide with the connection center line of the throttle body 26, and permitting the front collection pipe 24F, after extending obliquely rearward and to the left from the left-hand end of the front surge tank 9F to curve obliquely forward and to the left and the central axis thereof to coincide with the connection center line of the throttle body 26, the resistance of intake air flowing toward each collection pipe 24F or 24R from the throttle body 26 becomes small. In addition, the distribution of intake air to each collection pipe 24F or 24R is improved.

Furthermore, due to the structure permitting the second communication pipe 18 to curve in a vertical plane and the valve shaft 20b of the second changeover valve 20 to extend in the lengthwise direction of the car body, i.e., in a vertical plane including the central axis of the second communication pipe 18, despite a curved portion in the communication pipe 18, the communication passage 19 can be made large in cross sectional area when the changeover valve 20 is open, and the resistance to intake air is reduced.

In addition, because the front and rear resonant passages 25F and 25R are superimposed one above the other, as compared with a case in which such passages are arranged side by side in a substantially horizontal plane, both the front and rear resonant passages 25F and 25R can be isolated up to the vicinity of the throttle body 26, so that each resonant passage 25F or 25R is allowed to have a large curvature. The resistance of intake air is, therefore, reduced. Because the exhaust gas recirculation passage 27 in communication with the resonant passages 25F and 25R can be located either in front of or rearwardly of and behind the resonant passages 25F and 25R, the location of the exhaust gas recirculation passage 27 can easily be selected without being limited by the bonnet 32 or the cylinder head covers 4F and 4R and the like. Moreover, a blow-by gas passage may be substituted for the exhaust gas recirculation passage 27 and provide similar effects.

Figure 7:
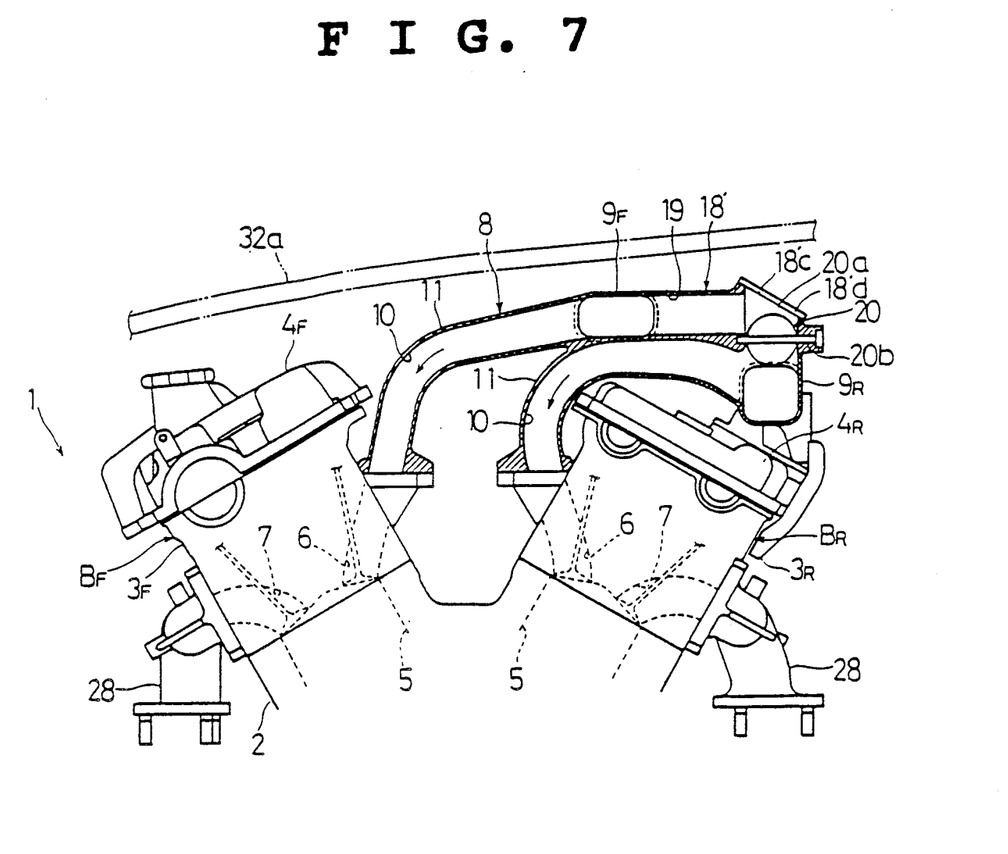
FIG. 7 is a side view showing, partly in cross section, part of a V-type internal combustion engine with an intake system in accordance with another preferred embodiment of the present invention.
Figure 8:
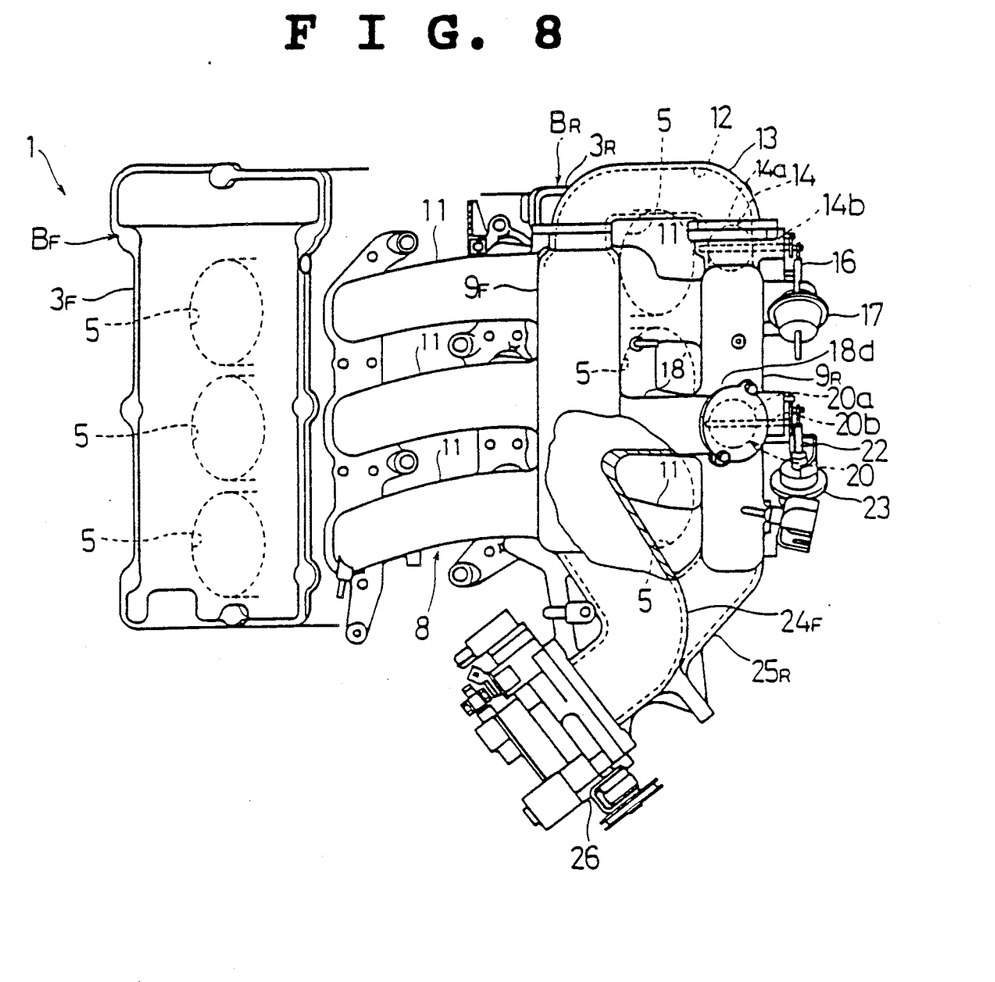
FIG. 8 is a plan view of FIG. 7.
Figure 9:
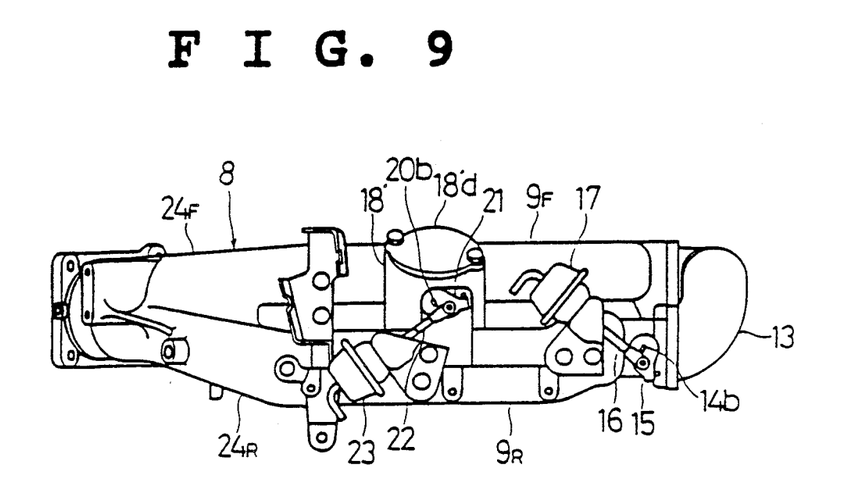
FIG. 9 is a rear view showing an intake manifold of the intake system shown in FIG. 7.
Figure 10:
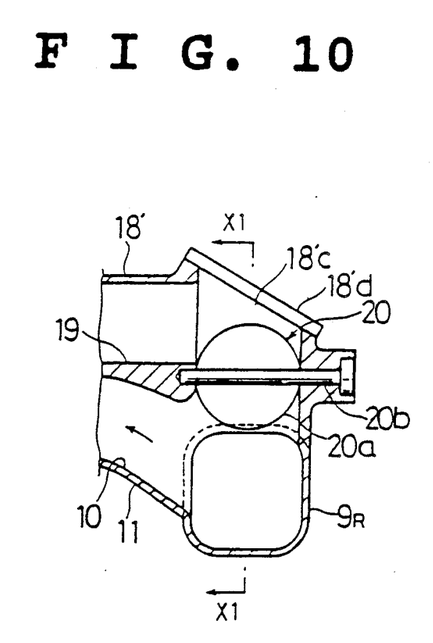
FIG. 10 is an enlarged view showing a second changeover valve of the intake system shown in FIG. 7.
Figure 11:
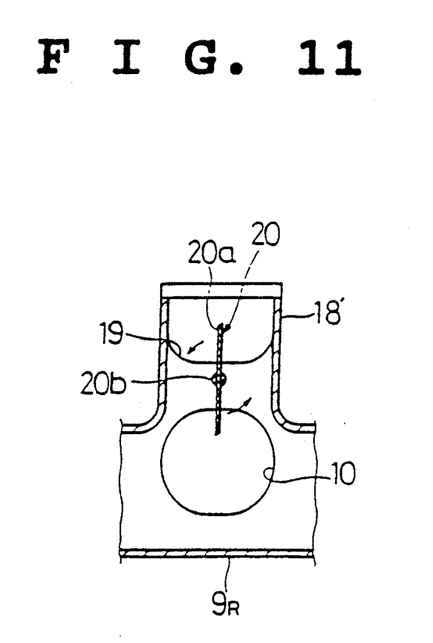
FIG. 11 is a cross-sectional view of FIG. 10 as seen along line XI—XI.

Referring to FIGS. 7 to 9, a V-type, six-cylinder, internal combustion engine with an intake system in accordance with another preferred embodiment of the present invention is shown, and includes a different structure of second connecting pipe. The second communication pipe 18' is formed integrally with the surge tanks 9F and 9R and is provided with a second changeover valve 20 disposed at its rear end portion. This second changeover valve 20, which is substantially similar in structure to that of the previous embodiment, comprises a valve shaft 20b extending substantially horizontally in the lengthwise direction in a vertical plane including the central axis of the second communication pipe 18' and a disk-shaped valve body 20a secured to the valve shaft 20b. The second changeover valve 20 is actuated by an actuator 23 to open. The second communication pipe 18' is formed with an opening 18c' in the upper portion thereof to dispose the valve body 20a of the second changeover valve 20 in the opening 18c'. This opening 18c' is closed air-tightly by a conventional cover 18d'.

In this embodiment, in a range of higher engine speeds, the second changeover valve 20 is opened to communicate both surge tanks 9F and 9R with each other through a communication passage 19 of the second communication pipe 18', so that the resonance effect of intake air is abolished and a drop in engine output torque can be controlled. In addition, despite the presence of a curved portion of the communication passage 19, the communication passage 19 can be kept large in cross sectional area while the second changeover valve 20 is open.

Also, the connection portion of the resonant passage 25F of the front surge tank 9F is disposed adjacent to the connection portion of the communication pipe 18', so that the resonance function of intake air pressure waves in the resonant passages 25F and 25R is enhanced or increased and, accordingly, the output torque of the engine 1 is maintained in the range of lower engine speeds.

It is to be understood that although the invention has been described in detail with respect to preferred embodiments thereof, nevertheless, various other embodiments and variants are possible which are within the scope and spirit of the invention, and such other embodiments and variants are intended to be covered by the following claims:

What is claimed is:

1. An intake system having a throttle body for delivering air into a plurality of cylinders of an internal combustion engine, the cylinders being divided into first and second groups, and the cylinders in each group being arranged in one and the same row so that adjoining cylinders in each row do not fire one after another, said intake system comprising:

intake passages connected independently to the cylinders of each said row;

first and second elongated conflux chamber means with which said intake passages of said first and second rows of cylinders communicate, respectively;

communication passage means for communicating said first and said second elongated conflux chamber means with each other;

valve means disposed in said communication passage means for opening and shutting said communication passage means; and first and second resonant passage means each connected at one end to said first and said second elongated conflux chamber means, respectively, and communicated with each other at the throttle body, said first resonant passage means having a connection point in a lengthwise direction thereof to said first elongated conflux chamber means closer to a connection point of said communication passage to said first elongated conflux chamber than a connection point in a lengthwise direction of said second resonant passage means to said second elongated conflux chamber means so as to provide a volume between said first elongated conflux chamber means and said first resonant passage means which is larger than a volume provided between said second elongated conflux chamber means and said second resonant passage means.

2. An intake system as recited in claim 1, wherein said first resonant passage means comprises a passage part having a center axis having an extension which intersects an extension of a center axis of said communication passage at an acute angle.

3. An intake system as recited in claim 2, wherein said first and second resonant passage means comprise an integral pipe forming therein first and second passages separately, said integral pipe partly branching off into two pipe parts to be connected to said first and second elongated conflux chamber means.

4. An intake system as recited in claim 3, wherein said first and second passages join together at the throttle body.

5. An intake system as recited in claim 4, wherein each passage has a semi-circular cross section.

6. An intake system as recited in claim 2, wherein said communication passage means comprises a pipe interconnecting said first and second elongated conflux chamber means at middle portions thereof in the lengthwise direction.

7. An intake system as recited in claim 2, wherein each said elongated conflux chamber means comprises a surge tank.

8. An intake system as recited in claim 2, wherein said valve means comprises a butterfly valve operative to open and shut said communication means according to engine speeds.

* * * * *